US010648215B2

(12) United States Patent
Lee (10) Patent No.: US 10,648,215 B2
(45) Date of Patent: May 12, 2020

(54) DAMPER DEVICE FOR GLOVE COMPARTMENT

(71) Applicant: NIFCO KOREA INC., Asan-si, Chungheongnam-do (KR)

(72) Inventor: Dae Won Lee, Chungcheongnam-do (KR)

(73) Assignee: NIFCO KOREA INC. (KR)

( * ) Notice: Subject to any disclaimer, the term of this patent is extended or adjusted under 35 U.S.C. 154(b) by 0 days.

(21) Appl. No.: 16/222,584

(22) Filed: Dec. 17, 2018

(65) Prior Publication Data

US 2019/0194997 A1    Jun. 27, 2019

(30) Foreign Application Priority Data

Dec. 22, 2017    (KR) .......................... 10-2017-0177973

(51) Int. Cl.
*E05F 5/02*  (2006.01)
*E05F 3/14*  (2006.01)
*E05F 5/06*  (2006.01)
*B60R 7/06*  (2006.01)

(52) U.S. Cl.
CPC .............. *E05F 5/022* (2013.01); *E05F 3/14* (2013.01); *E05F 5/06* (2013.01); *B60R 7/06* (2013.01); *E05Y 2201/212* (2013.01); *E05Y 2900/538* (2013.01)

(58) Field of Classification Search
CPC ... E05F 5/02; E05F 5/022; E05F 5/025; E05F 5/027; E05F 5/06; E05F 3/14; B60R 7/06
See application file for complete search history.

(56) References Cited

U.S. PATENT DOCUMENTS

| 7,350,629 | B2 * | 4/2008 | Anton | ....................... E05F 5/00 188/82.1 |
| 7,740,116 | B2 * | 6/2010 | Cultraro | ................ E05C 19/022 188/290 |
| 8,925,696 | B2 * | 1/2015 | Zeilenga | .................... F16F 1/10 188/290 |
| 9,382,965 | B2 * | 7/2016 | Zhang | ........................ E05F 3/14 |
| 9,937,866 | B2 * | 4/2018 | Jeon | .......................... B60R 7/06 |

(Continued)

FOREIGN PATENT DOCUMENTS

| JP | 2005048929 A | 2/2005 |
| JP | 2017-159696 A | 9/2017 |

(Continued)

*Primary Examiner* — Jeffrey O'Brien
(74) *Attorney, Agent, or Firm* — Thomas Horstemeyer, LLP (57) ABSTRACT

There is provided a damper device for a glove compartment has a housing, a damping unit, a rack member and a gear. An insertion hole is formed through a bottom surface of the housing. The damping unit has a case which is fixed to the housing, and a rotation shaft which extends into an inside of the housing. The rack member is removably installed to the housing and is movable back and forth with respect to the housing. The gear is removably coupled to the rotation shaft through the insertion hole of the housing and meshes with the rack member. The case has a boss which protrudes into the housing and is received in the inside of the housing. The gear has a non-gear portion which is inserted to the insertion hole, and a flange which is in contact with the bottom surface of the housing.

10 Claims, 9 Drawing Sheets

(56) References Cited

U.S. PATENT DOCUMENTS

| | | | | |
|---|---|---|---|---|
| 2001/0008037 A1* | 7/2001 | Brustle | ............... | E05F 1/16 |
| | | | | 16/71 |
| 2004/0145284 A1* | 7/2004 | Egger | ............... | E05F 5/02 |
| | | | | 312/331 |
| 2008/0224370 A1* | 9/2008 | Derr | ............... | E05F 5/00 |
| | | | | 267/195 |
| 2015/0204130 A1* | 7/2015 | Vojtisek | ............... | E05F 1/1083 |
| | | | | 16/64 |
| 2019/0203509 A1* | 7/2019 | Kondo | ............... | B60R 7/06 |

FOREIGN PATENT DOCUMENTS

| | | |
|---|---|---|
| KR | 1019980031450 A | 7/1998 |
| KR | 10-2008-0072838 A | 8/2008 |
| KR | 10-2016-0028661 A | 3/2016 |
| WO | 2007/058828 A1 | 5/2007 |

\* cited by examiner

DAMPER DEVICE FOR GLOVE COMPARTMENT

CROSS-REFERENCE TO RELATED APPLICATION

This application is based upon and claims the benefit of priority from Korean Patent Application No. 10-2017-0177973, filed on Dec. 22, 2017, the entire contents of which are incorporated herein by reference.

TECHNICAL FIELD

The present disclosure relates to a glove compartment which is provided in front of a passenger seat and stores small objects therein. More particularly, the present disclosure relates to a damper device for such a glove compartment.

BACKGROUND

In general, a glove compartment (glove box) is a storage part which is located approximately at knee height of a person who sits on a passenger seat. A door of the glove compartment is configured to be opened slowly by means of a damper, preventing the door from suddenly dropping due to its weight when the door is opened.

Figure 1:
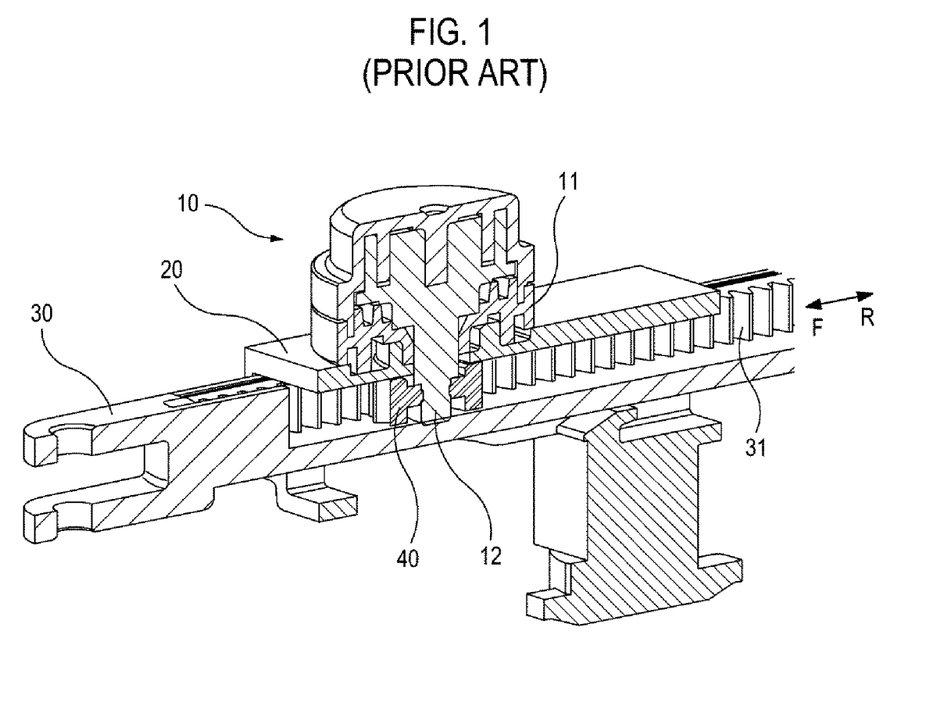
FIG. 1 is a sectional perspective view showing a device for opening and closing a glove compartment from a prior art.
Figure 2:
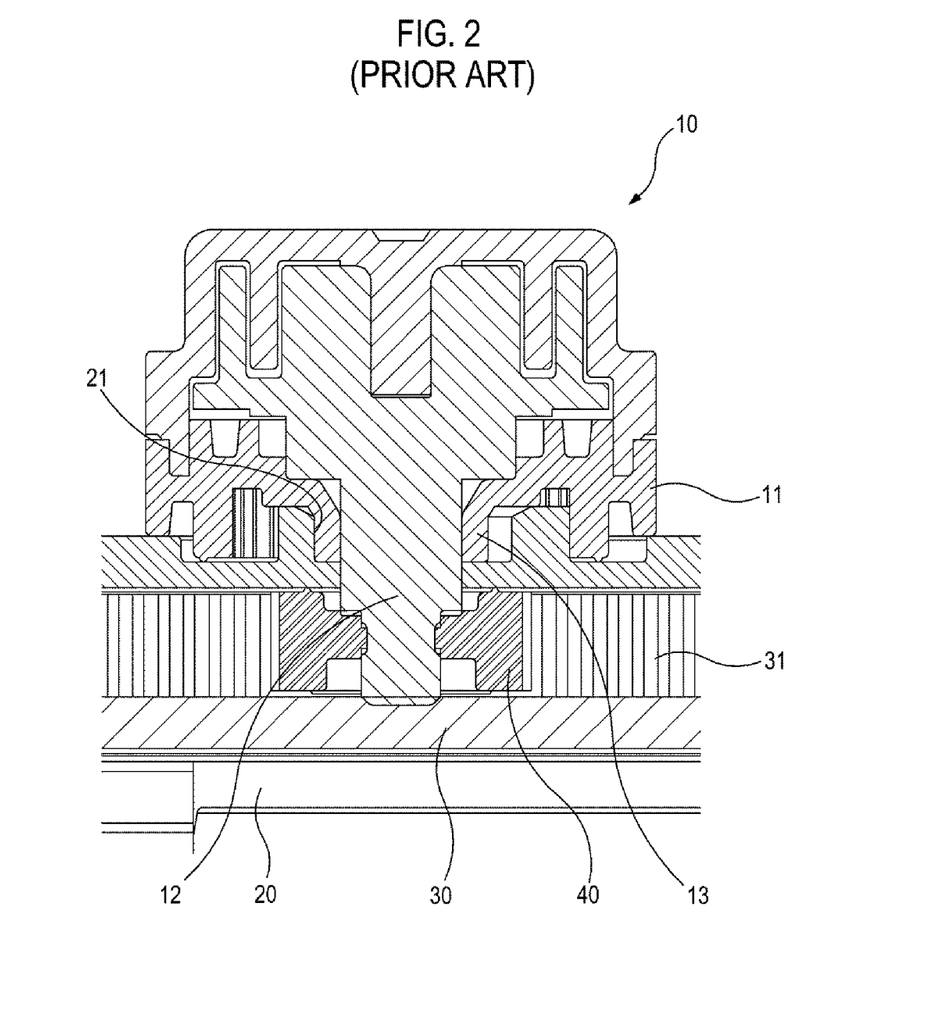
FIG. 2 is a longitudinal sectional view showing main parts of the device of the prior art.
Figure 3:
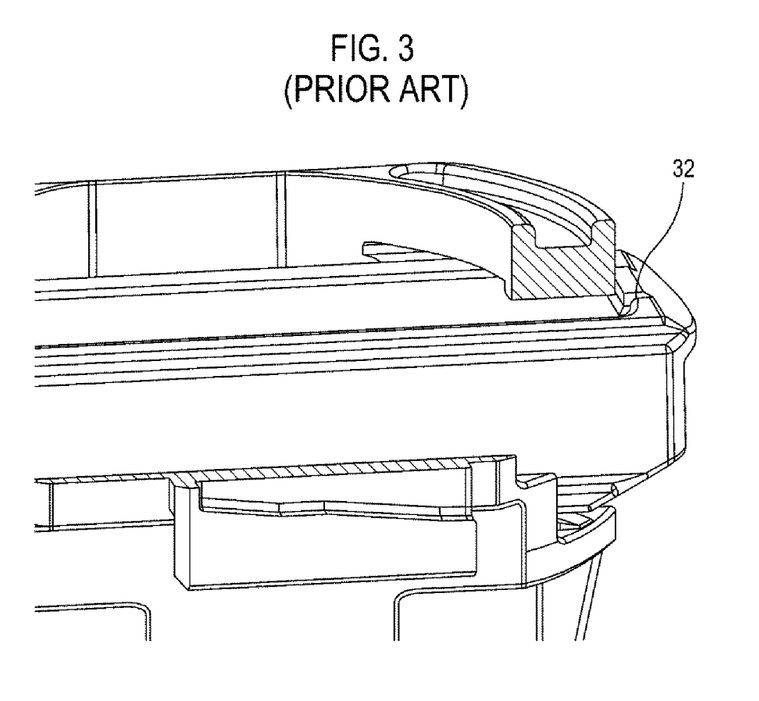
FIG. 3 is a perspective view showing that a rack member is engaged with a rear end of a housing in the device of the prior art.

FIG. 1 is a sectional perspective view showing a device for opening and closing a glove compartment from a prior art. FIG. 2 is a longitudinal sectional view showing main parts of the device of the prior art. FIG. 3 is a perspective view showing that a rack member is engaged with a rear end of a housing. A damper case 11 is fixed to a lower portion of a damping unit 10 and is configured to fix the damping unit 10 to the housing 20. A rack member 30 is installed in the housing 20 so as to be moved back and forth. The rack member 30 is connected, at its front end, to a door (not shown) of a glove compartment. A gear 40, which is fixed to a rotation shaft 12 of the damping unit 10, is installed so as to mesh with a rack 31 of the rack member 30.

A boss 13 of the damper case 11 is fitted to an insertion groove 21 of the housing 20 and serves to support the damping unit 10.

A protruding step 32 is formed at a rear end of the rack member 30. The protruding step 32 prevents the rack member 30 from being demounted from the housing 20 when the door is completely opened. The opposite side of the protruding step 32 is formed to have the same width so that the rack member 30 can be assembled from the rear end of the housing 20.

When a passenger pushes the door in order to open the glove compartment when necessary, the door is opened while a lock device (not shown) of the door is released from the locked state. Therefore, the rack member 30 is moved in a front direction (F) shown in FIG. 1.

The gear 40 fixed to the rotation shaft 12 of the damping unit 10 is in mesh with a rack 31 of the rack member 30. As the rack member 30 is moved in the front direction (F), the gear 40 is rotated. Therefore, a damping force acts to gradually open the door.

However, the above-described device of the prior art has the following problems.

Since the boss of the damper case constituting the damping unit is fitted and fixed to the insertion groove of the housing, a support structure for the damping unit is weak. When the rack member is moved in the front direction in FIG. 1 due to the opening of the door, a reaction force acts on the damping unit in a direction opposite to the movement direction of the rack member. Therefore, the damping unit is prone to be tilted toward one side.

The damping unit is gradually tilted from the housing toward one side because of the repeated opening and closing of the door. Thus, noise is generated whenever the door is opened or closed.

Further, since the protruding step is formed at the rear end of the rack member so as to prevent the rack member from being demounted from the housing, the rack member must be assembled to the housing only by pushing a front end of the rack member into the housing from the rear side of the housing. This restricts a firm design for an assembly portion of the rack member where the rack member is assembled to the door. Further, the rack member may be frequently demounted from the housing.

SUMMARY

Some embodiments of the present disclosure provide a damper device for a glove compartment, which improves the mounting strength of a damping unit and can prevent the damping unit from tilting toward one side from a housing notwithstanding repeated opening and closing of a door.

Further, some embodiments of the present disclosure provide a damper device for a glove compartment, which allows the rack member to be assembled to the housing from a front end of the housing and does not allow the rack member to be demounted from the housing such that the rack member can be firmly installed to the door.

According to an embodiment of the present disclosure, a damper device for a glove compartment comprises a housing, a damping unit, a rack member, and a gear. An insertion hole is formed through a bottom surface of the housing. The damping unit includes a case which is fixed to the housing, and a rotation shaft which extends into an inside of the housing. The rack member is removably installed to the housing and is movable back and forth with respect to the housing. The gear is removably coupled to the rotation shaft through the insertion hole of the housing and meshes with the rack member. The case includes a boss which protrudes into the housing and is received in the inside of the housing. The gear includes a non-gear portion and a flange. When the gear is coupled to the rotation shaft through the insertion hole, the non-gear portion is inserted to the insertion hole and the flange is in contact with the bottom surface of the housing.

According to an embodiment, the non-gear portion has a cylindrical shape.

According to an embodiment, the rotation shaft penetrates through an inside of the boss.

According to an embodiment, the non-gear portion and the flange are formed integrally.

According to an embodiment, an engagement groove is formed in the rotation shaft. An assembly hole is formed in the gear, and the rotation shaft is coupled to the assembly hole. A pair of ribs are formed in the assembly hole. A pair of snap-fits, which are engaged with and supported by the engagement groove, are formed in the ribs respectively so as to be opposite to each other.

According to an embodiment, a plurality of contact portions are formed in the flange, and a protrusion which is in contact with the bottom surface of the housing is formed on an upper surface of each contact portion.

According to an embodiment, a recess, in which the flange is received, is formed in the bottom surface of the housing.

According to an embodiment, the rack member includes a hook at a rear end of the rack member. The rack member is inserted into a front end of the housing from the hook.

According to an embodiment, the housing includes a receiving portion, in which the hook is received, at the rear end of the housing.

According to an embodiment, the housing includes an inclined portion at the front end of the housing. When the rack member is inserted into the housing, the inclined portion is in contact with the hook and elastically deforms the hook.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Figure 4:
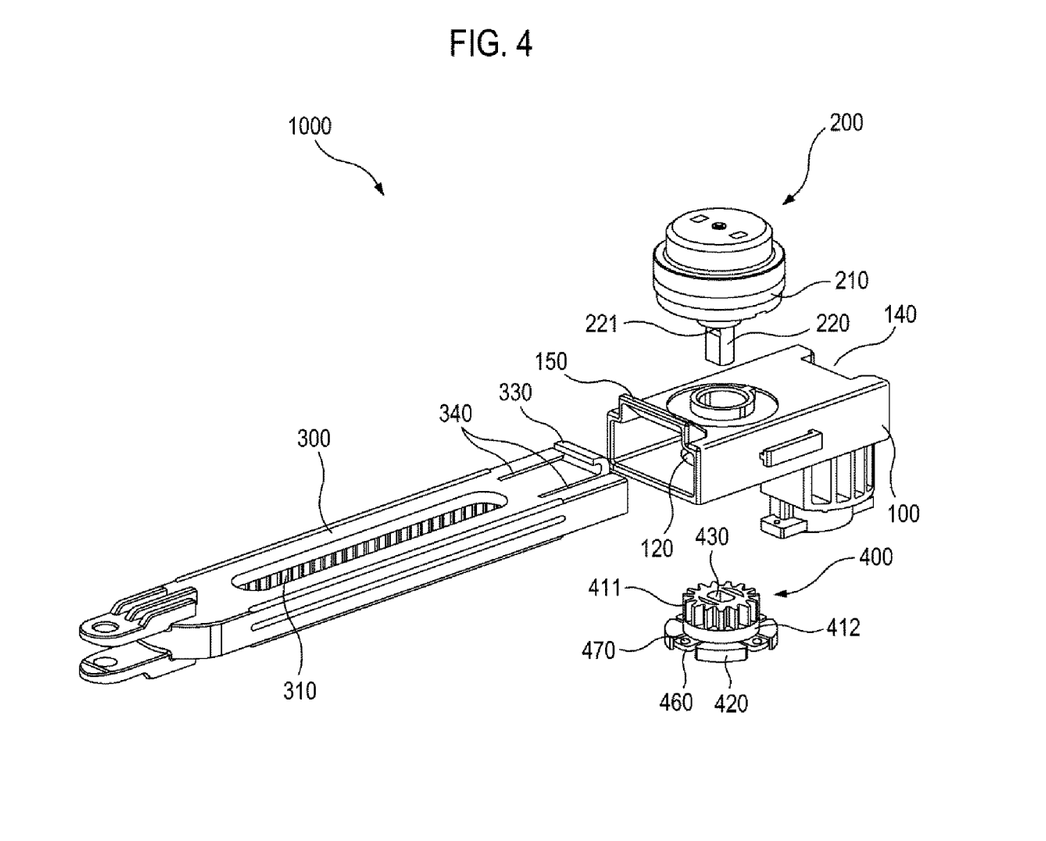
FIG. 4 is an exploded perspective view showing an embodiment of the present disclosure.
Figure 5:
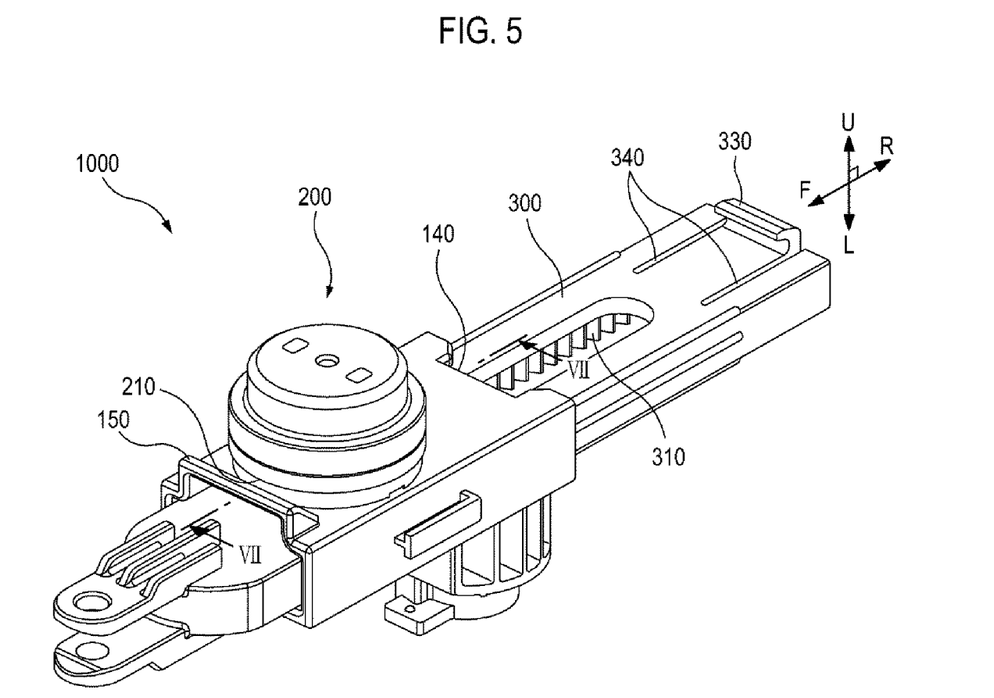
FIG. 5 is a perspective view showing an assembled embodiment of the present disclosure.
Figure 6:
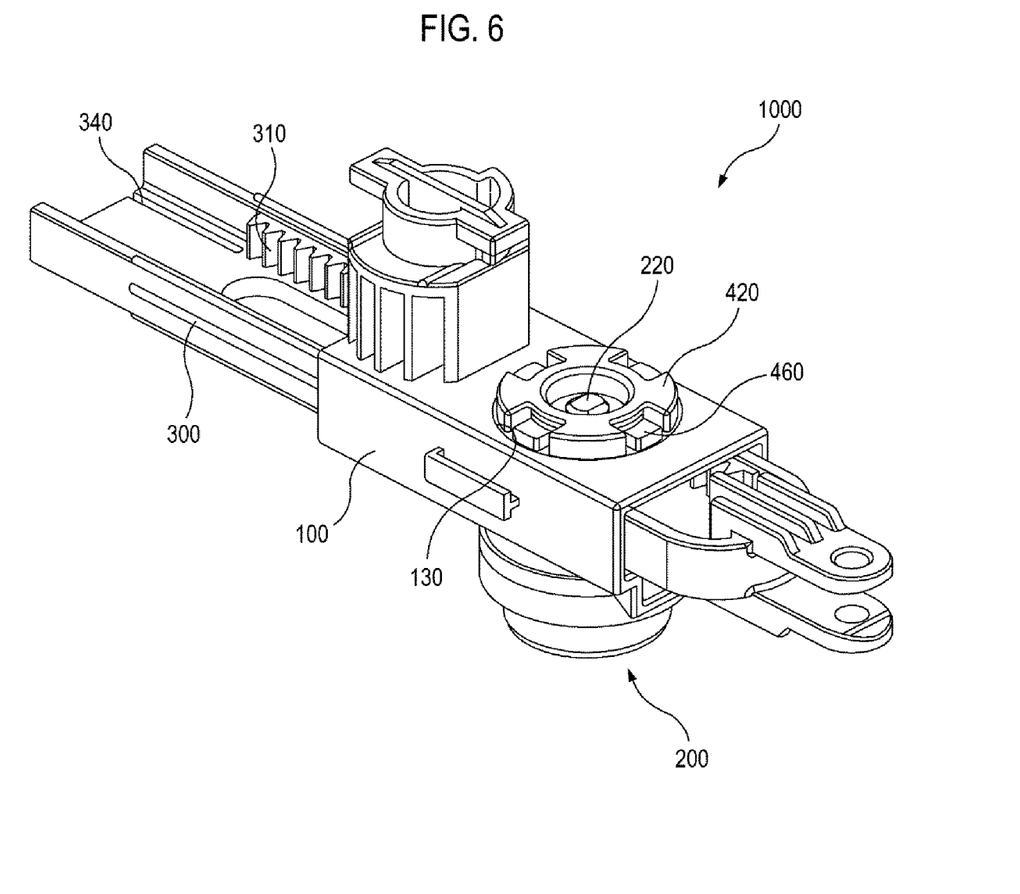
FIG. 6 is a bottom perspective view showing an assembled embodiment of the present disclosure.
Figure 7:
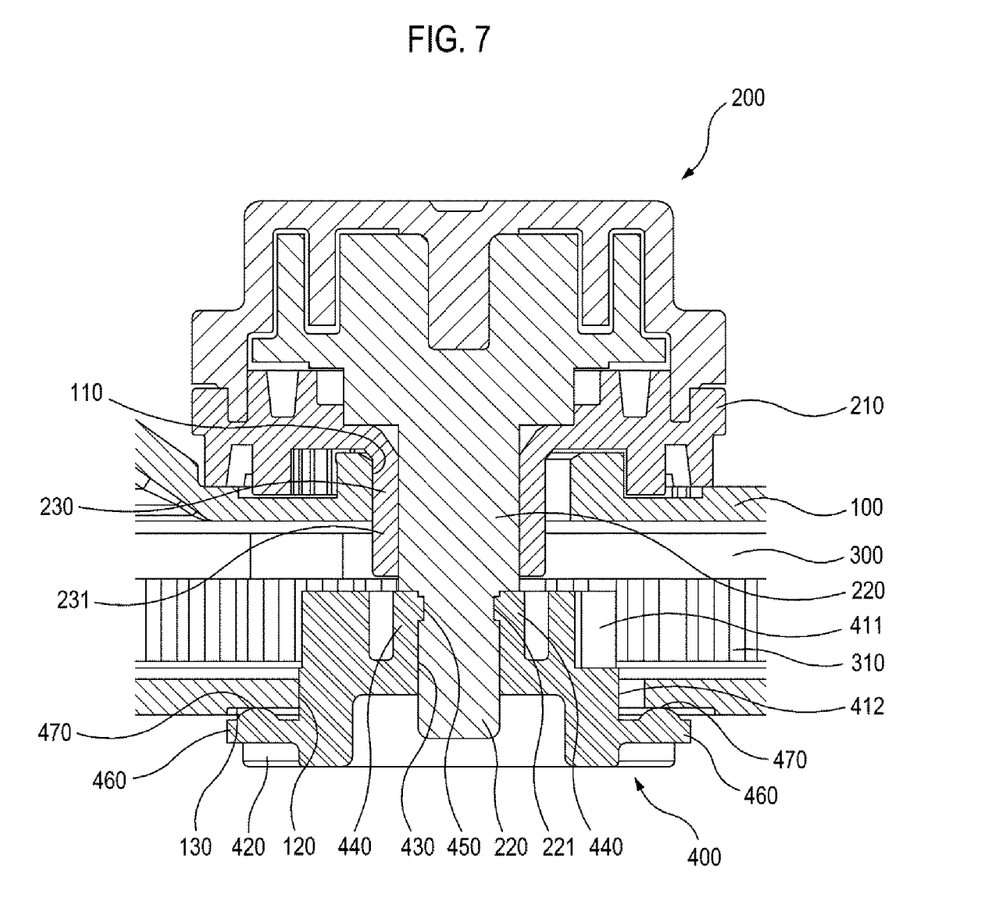
FIG. 7 is a sectional view taken along the line VII-VII of FIG. 5.
Figure 8:
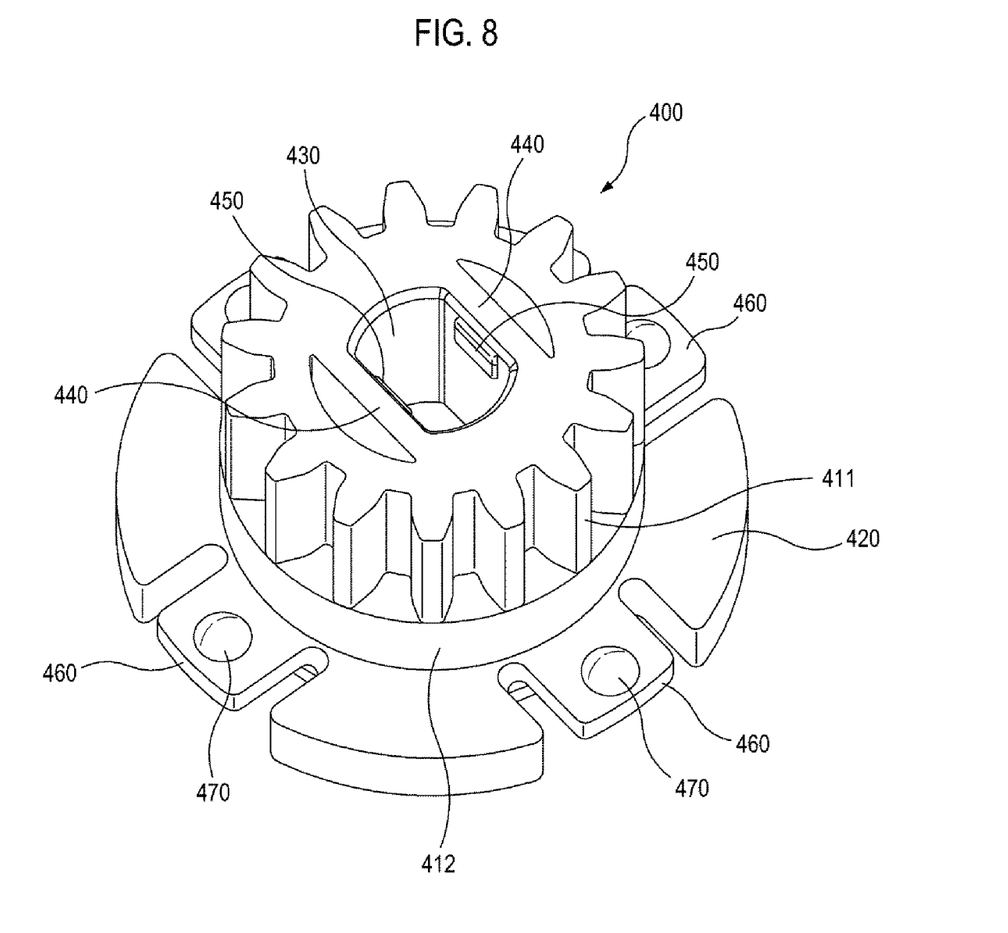
FIG. 8 is a perspective view showing a gear according to an embodiment of the present disclosure.
Figure 9:
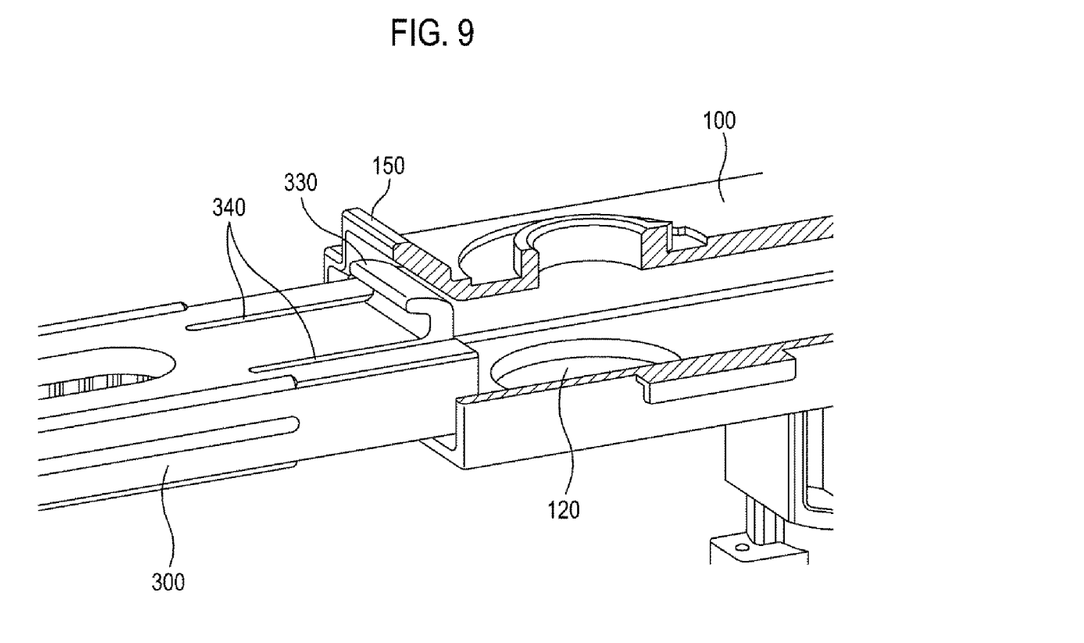
FIG. 9 is a perspective view showing that a housing and a rack member according to an embodiment of the present disclosure are assembled together.

FIG. 4 is an exploded perspective view showing an embodiment of the present disclosure. FIG. 5 is a perspective view showing an assembled embodiment of the present disclosure. FIG. 6 is a bottom perspective view showing an assembled embodiment of the present disclosure. FIG. 7 is a sectional view taken along the line VII-VII of FIG. 5. FIG. 8 is a perspective view showing a gear according to an embodiment of the present disclosure. FIG. 9 is a perspective view showing that a housing and a rack member according to an embodiment of the present disclosure are assembled together. The descriptions on the same elements as those of a prior art will be omitted in the following descriptions, and such elements are denoted by the same reference numerals as those of a prior art.

A damper device 1000 for a glove compartment according to an embodiment of the present disclosure comprises a housing 100, a damping unit 200, a rack member 300, and a gear 400. The damping unit 200 is coupled to the housing 100, and includes a rotation shaft 220 for generation of a damping force. The rotation shaft 220 of the damping unit 200 extends into an inside of the housing 100. The rack member 300 is removably installed to the housing 100 and is movable back and forth with respect to the housing 100. The rack member 300 is connected, at its front end, to a door (not shown) of a glove compartment. The gear 400 meshes with a rack 310 of the rack member 300. Further, the gear 400 is removably coupled to the rotation shaft 220 of the damping unit 200. The gear 400 rotates the rotation shaft 220 of the damping unit 200 while being rotated along with the movement of the rack member 300.

The damping unit 200 includes a case 210 which is fixed to the housing 100 and constitutes the damping unit 200. The case 210 includes a boss 230 which protrudes into the housing 100 and is received in the inside of the housing 100. The boss 230 has an extension 231 which is received in the inside of the housing 100 and extends downward. An insertion hole 110 is formed through an upper surface of the housing 100. The boss 230 and the extension 231 of the case 210 are fitted to the insertion hole 110. If the case 210 is assembled to the housing 100, the extension 231 of the boss 230 is received in the housing 100. Therefore, the boss 230 and the extension 231 of the boss 230 supports an upper portion of the damping unit 200.

The gear 400 is coupled to the rotation shaft 220 of the damping unit 200. As shown in FIG. 8, the gear 400 includes a gear portion 411, a cylindrical non-gear portion 412, and a flange 420. The gear portion 411 of the gear 400 meshes with the rack 310 of the rack member 300. The non-gear portion 412 may include a cylindrical outer circumferential surface of the gear 400. The non-gear portion 412 is disposed below the gear portion 411, and does not mesh with the rack 310 of the rack member 300. The flange 420 may protrude from the non-gear portion 412 in a radially outward direction. The non-gear portion 412 and the flange 420 may be formed integrally together. Further, the gear portion 411, the non-gear portion 412 and the flange 420 may be formed integrally together. The gear 400 is coupled to the rotation shaft 220 through an insertion hole 120 formed through a bottom surface of the housing 100. If the gear 400 is coupled to the rotation shaft 220, the non-gear portion 412 is inserted to the insertion hole 120 and connects with an inner circumferential surface of the insertion hole 120, and the flange 420 comes into contact with the bottom surface of the housing 100, thereby firmly supporting a lower portion of the damping unit 200.

The rotation shaft 220 of the damping unit 200 extends into the inside of the housing 100. As shown in FIG. 7, the rotation shaft 220 extends into the inside of the housing 100 while penetrating through the boss 230 and the extension 231 of the boss 230. An engagement groove 221 is formed in the rotation shaft 220. The engagement groove 221 is formed along the circumference of the rotation shaft 220 in a direction perpendicular to the rotation shaft 220. An assembly hole 430, to which the rotation shaft 220 is coupled, is formed through the gear 400. A pair of ribs 440 are formed at the assembly hole 430 of the gear 400. A snap-fit 450 is formed at each rib 440. A pair of snap-fits 450 are located opposite to each other. The snap-fits 450 are engaged with and supported by the engagement groove 221.

Due to the engagement groove 221 and the snap-fits 450, the gear 400 can be firmly fixed to the rotation shaft 220. Thus, the fixed position of the gear 400 on the rotation shaft 220 is prevented from varying in an upward direction (U) and a downward direction (L).

A plurality of contact portions 460 are formed at equal spacings in the flange 420 which is formed integrally with the gear 400. A protrusion 470 is formed on an upper surface of each contact portion 460. The protrusion 470 comes into contact with the bottom surface of the housing 100. According to an embodiment, as shown in FIG. 6, a recess 130 is formed in the bottom surface of the housing 100. The recess 130 receives the flange 420. Therefore, when the rack member 300 is moved back and forth, the gear 400 can be rotated more stably in the state where the gear 400 is assembled to the housing 100. The protrusion 470 may have, but is not limited to, a hemispherical shape. The recess 130 may have, but is not limited to, an annular shape.

The rack member 300 includes a hook 330 at a rear end of the rack member 300. The hook 330 has cutouts 340. As shown in FIG. 9, the hook 330 can be elastically deformed due to the cutouts 340. The rack member 300 can be assembled to the housing 100 from a front end of the housing 100. When the rack member 300 is assembled to the housing 100, the rack member 300 can be inserted into the front end of the housing 100 from the hook 330.

Accordingly, the rack member 300 according to an embodiment is advantageous since the rack member 300 can be designed so as to increase the strength of a door installation portion (front end) of the rack member 300.

The housing 100 may include a receiving portion 140, which receives the hook 330, at the rear end of the housing 100. The receiving portion 140 can reduce an installation space of the damper. The housing 100 may include an inclined portion 150 at the front end of the housing 100. The inclined portion 150 contacts the hook 330 and can elastically deform the hook 330 downwards. When the rack member 300 is assembled to the housing 100, i.e., when the rack member 300 is inserted into the front end of the housing 100 from the hook 330, the hook 330 can be easily elastically deformed due to the inclined portion 150.

Descriptions will be made as to an assembly example and an operation example of an embodiment of the present disclosure.

When the rack member 300 is assembled to the housing 100, the rack member 300 is assembled from the front end of the housing 100, unlike the assembly example of the prior art.

That is, as shown in FIG. 9, as the hook 330 formed at the rear end of the rack member 300 is inserted into the housing 100 from the front end of the housing 100, the hook 330 is inserted into the housing 100 while being deformed due to the cutouts 340. If the hook 330 passes the housing 100, the hook 330 is restored due to its elastic force. Therefore, the rack member 300 can be assembled to the housing 100.

After the rack member 300 is assembled to the housing 100 in the above-described manner, the damping unit 200 is assembled at the upper portion of the housing 100, and the assembly hole 430 of the gear 400 is pushed to the rotation shaft 220 through the insertion hole 120 formed in the lower portion of the housing 100.

As the gear 400 is pushed to the rotation shaft 220 as described above, the snap fits 450, which are formed opposite each other in a pair of the ribs 440, are engaged with the engagement groove 221 of the rotation shaft 220. At the same time, the flange 420, which is integrally formed in the lower portion of the gear 400, is received in the recess 130 formed in the housing 100, and the protrusions 470 formed on the contact portions 460 elastically connect with the bottom surface of the housing 100. Therefore, the assembly work of an embodiment is completed.

If a passenger pushes the door of a glove compartment in order to open the glove compartment when necessary, the door is opened while a lock device (not shown) of the door is released from the locked state. Then, the rack member 300 is moved in a front direction (F) shown in FIG. 5.

The gear 400 fixed to the rotation shaft 220 of the damping unit 200 is in mesh with the rack 310 of the rack member 300. Thus, as the rack member 300 is moved in the front direction (F), the gear 400 is rotated. Therefore, a damping force acts to gradually open the door of the glove compartment. The above-described opening operation of the door is the same as the opening operation of the prior art.

However, the boss 230 extends up to and is received in the inside of the housing 100, thereby supporting the upper portion of the damping unit 200. At the lower portion of the damping unit 200, the gear 400 is fixed to the rotation shaft 220 through the insertion hole 120 formed through the bottom surface of the housing 100. The non-gear portion 412 of the gear 400 is inserted to the insertion hole 120 and closely connects with the inner circumferential surface of the insertion hole 120. Further, the flange 420 is positioned in the recess 130 of the housing 100, and the protrusions 470 of the contact portions 460 formed in the flange 420 connect with the recess 130, thus supporting the lower portion of the damping unit 200. Accordingly, although a reaction force caused by the movement of the rack member 300 acts on the damping unit 200, the damping unit 200 is not tilted toward one side. Further, the damping force is generated by the oil filled inside the damping unit 200 while the gear 400 is stably rotated.

According to the present disclosure in some embodiments, the boss 230 of the case 210 extends up to the inside of the housing 100, thus supporting the upper portion of the damping unit 200. Further, the non-gear portion 412 of the gear 400 is inserted to the insertion hole 120 of the housing 100, and the flange 420 of the gear 400 comes into close contact with the bottom surface of the housing 400, thus supporting the lower portion of the damping unit 200. Therefore, although a reaction force acts on the damping unit 200 as the rack member 300 is moved to the front side of the glove compartment, the damping unit 200 can be basically prevented from tilting toward one side.

According to the present disclosure in some embodiments, the engagement groove 221 is formed in the rotation shaft 220, and the snap-fits 450, which are engaged with and supported by the engagement groove 221, are formed in the ribs 440 of the gear 400. Therefore, the fixed state of the gear 400 can be firmly maintained.

According to the present disclosure in some embodiments, the contact portions 460 are formed at the flange 420 of the gear 400, and the protrusion 470, which connects with the recess 130 formed in the bottom surface of the housing 100, is formed in each contact portion 460. Therefore, the rack member 300 can be stably moved while being moved back and forth.

According to the present disclosure in some embodiments, the hook 330 having the cutouts 340 is formed at the rear end of the rack member 300. Therefore, the rack member 300 can be assembled from the front end of the housing 100, and the strength of the door installation portion of the rack member 300 can be increased.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A damper device for a glove compartment, comprising:
a housing in which an insertion hole is formed through a bottom surface of the housing;
a damping unit including a case coupled to the housing and a rotation shaft extending into an inside of the housing;
a rack member removably installed in the housing, the rack member being movable back and forth with respect to the housing; and
a gear removably coupled to the rotation shaft through the insertion hole of the housing and meshing with the rack member,
wherein the case includes a boss protruding into the housing and received in the inside of the housing,
wherein the gear includes a non-gear portion and a flange, and
wherein, when the gear is coupled to the rotation shaft through the insertion hole, the non-gear portion is inserted in the insertion hole and the flange is in contact with the bottom surface of the housing.

2. The damper device of claim 1, wherein the non-gear portion has a cylindrical shape.

3. The damper device of claim 1, wherein the rotation shaft penetrates through an inside of the boss.

4. The damper device of claim 1, wherein the non-gear portion and the flange are formed integrally.

5. The damper device of claim 1, wherein an engagement groove is formed in the rotation shaft,
wherein an assembly hole is formed in the gear, the rotation shaft being coupled to the assembly hole,
wherein a pair of ribs are formed in the assembly hole, and
wherein a pair of snap-fits are formed in the ribs respectively so as to be opposite to each other, the snap-fits being engaged with and supported by the engagement groove.

6. The damper device of claim 1, wherein a plurality of contact portions are formed in the flange, and
wherein a protrusion which is in contact with the bottom surface of the housing is formed on an upper surface of each contact portion.

7. The damper device of claim 6, wherein a recess, in which the flange is received, is formed in the bottom surface of the housing.

8. The damper device of claim 1, wherein the rack member includes a hook at a rear end of the rack member, and
wherein the rear end of the rack member is insertable into a front end of the housing.

9. The damper device of claim 8, wherein the housing includes a receiving portion at the rear end of the housing, the hook being received in the receiving portion.

10. The damper device of claim 8, wherein the housing includes an inclined portion at the front end of the housing, and
wherein, when the rack member is inserted into the front end of the housing, the inclined portion is in contact with the hook and elastically deforms the hook.

* * * * *